United States Patent

Dalancon et al.

Patent Number: 5,999,265
Date of Patent: Dec. 7, 1999

[54] SYSTEM FOR MEASURING GAP AND MISMATCH BETWEEN OPPOSING PARTS

[75] Inventors: Thomas Dalancon, Guyancourt; Bernard Mutius, Marseille; Laurent Lebrat, Manosque, all of France; Sandro Marta, Alpicnano, Italy

[73] Assignees: Espace Industrie Controles S.A., France; Cord 3, s.a.s. Di Berri & C., Italy; ABB Barras Provence, France

[21] Appl. No.: 08/982,830

[22] Filed: Dec. 2, 1997

[30] Foreign Application Priority Data

Dec. 2, 1996 [FR] France ................................ 96 14764

[51] Int. Cl.$^6$ .................................................. G01B 11/29
[52] U.S. Cl. ...................................... 356/375; 250/559.24
[58] Field of Search ............................ 356/375, 376, 356/387, 237; 250/559.29, 559.2, 559.23, 559.26, 559.12

[56] References Cited

U.S. PATENT DOCUMENTS 5,129,010  7/1992  Higuchi et al. .
5,416,590  5/1995  Stover et al. .

FOREIGN PATENT DOCUMENTS 0132200  1/1985  European Pat. Off. .

OTHER PUBLICATIONS

French Search Report dated Aug. 18, 1997.

*Primary Examiner*—Frank G. Font
*Assistant Examiner*—Tu T. Nguyen
*Attorney, Agent, or Firm*—Ostrolenk, Faber, Gerb & Soffen, LLP

[57] ABSTRACT

A system for measuring gap and mismatch by optical triangulation projects two parallel light planes onto the parts to be characterized so as to form two brightness lines. The three-dimensional profiles of the parts are calculated along the brightness lines. Raw values of gap and mismatch are calculated, preferably using particular reference points and lines. These raw values are then corrected by reference to the separation between the light planes and the change in position of a reference point of the profile of one of the parts from one brightness line to the other.

14 Claims, 9 Drawing Sheets

FIG.3 PRIOR ART $J_T$ : theoretical gap perpendicular to the center of the gap $J^*$ : measured gap

SYSTEM FOR MEASURING GAP AND MISMATCH BETWEEN OPPOSING PARTS

BACKGROUND OF THE INVENTION

1. Field of the Invention

The present invention relates to dimensional measurement and, more particularly, to a system for the measurement of gap and mismatch between opposing surfaces.

Figure 1:
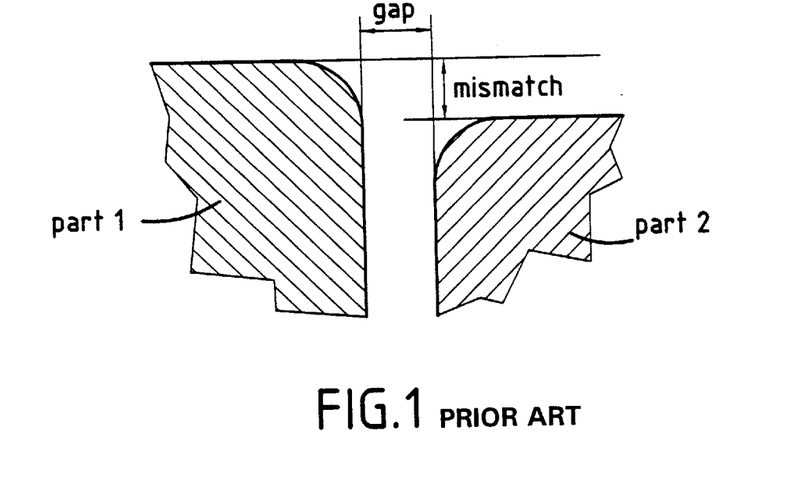
FIG. 1 is a diagram illustrating the definition of "gap" and "mismatch" parameters between two opposing parts.

In the industrial field it is often necessary to measure spaces which exist between two opposing surfaces with the aim, for example, of ensuring that these are indeed approximately equal to predetermined values and to access how these values change with time. The gap which exists between two surfaces is often significant from the point of view of the mechanical operation of the ensemble. The mismatch is closely related to the gap in certain complex configurations where parts are in contact, but more often it is related to aesthetic and aerodynamic considerations. FIG. 1 is a diagram illustrating the gap and mismatch between two opposing parts.

2. Description of the Prior Art

The conventional method for measuring gap and mismatch, particularly in the automobile or aeronautical industries, consists in the use of calipers or gauge blocks. The measurement instrument itself in often associated with a housing including components for storing and processing the collected data, and/or is connected to a computer or printer. These conventional systems have a number of disadvantages.

Firstly, any measurement system involving physical contact runs the risk of damaging the surfaces on which the measurement is made. Besides the problems of creating scratches on the surfaces, the stress exercised on the surfaces by the arms of a set of calipers can cause an increase in the size of the gap between the surfaces and, thus, distort the measurement. The latter problem is particularly serious in the case of measurements performed on thin cantilevered metal panels. Moreover, with these conventional systems it is not possible to satisfy the requirements of resolution and speed of measurement which are becoming more and more severe in the industrial sphere. Finally, and more importantly, the quality of the measurements made with such instruments is highly dependent upon the positioning of the apparatus with respect to the surfaces upon which the measurement is to be made. Thus the repeatability and reliability of the measurements that are obtained is highly dependent on the user.

More recently, non-contact systems, such as, for example, an optical triangulation system, have been proposed for the measurement of gap and mismatch. (An example of a system for measuring gap and mismatch by optical triangulation consists of the product known by the name AFFLEUREDIX, manufactured by the company EDIXIA). The general construction of such a system is illustrated in FIG. 2.

Figure 2:
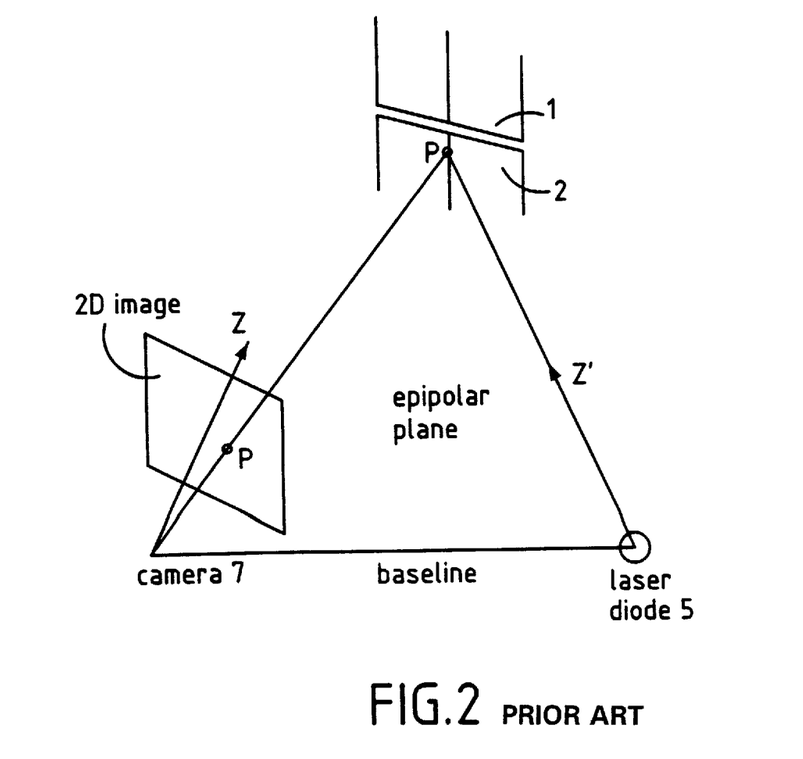
FIG. 2 is a diagram showing the main elements of a system for measuring gap and mismatch by conventional optical triangulation.

The basic principle underlying the system for measuring gap and mismatch by optical triangulation shown in FIG. 2 is derived from photogrammetry. A laminar beam of laser light is generated by a source (for example a laser diode 5) in association with optical elements. This planar sheet of light is projected onto the surfaces 1,2 on which the measurement is to be performed, in such a way as to illuminate a region including the interface between these surfaces and thus to create a brightness line, if possible perpendicular to the centre of the gap. The brightness line is located within the field of view of a video camera 7 which comprises an array (CCD type) image sensor. The array sensor of the camera is illuminated by the rays coming from the brightness line.

By virtue of a preliminary calibration step the internal geometry of the camera 7 is known and it is thus possible to associate to each pixel of the sensor a straight line in space. Thus, a straight line in space can be associated with each image point on the brightness line. The intersection between this straight line and one of the rays making up the incident light plane creates a triangle located in a plane called the "epipolar plane". The preliminary calibration also enables the separation between the camera 7 and the light source 5 (the baseline) to be determined, as well as the angle between this baseline and each point on the brightness line. For each point on the brightness line, it is thus possible to resolve the corresponding triangle located in the epipolar plane in order to determine the position of this point in three dimensions.

When the three-dimensional positions of the points on the brightness line have been determined, the positions of the edges of the two opposing surfaces are found and then the separation (the gap and mismatch) between these edges is found. The calculation of mismatch involves the determination of the location of the major surface of each of the opposing parts and the calculation of the height difference between these major surfaces.

The known optical triangulation systems enable rapid measurements of gap and mismatch to be made without risk of damaging the surfaces. However, the quality of the measurement that is made still depends upon the orientation of the measurement apparatus. This problem will now be explained with reference to FIG. 3.

Figure 3:
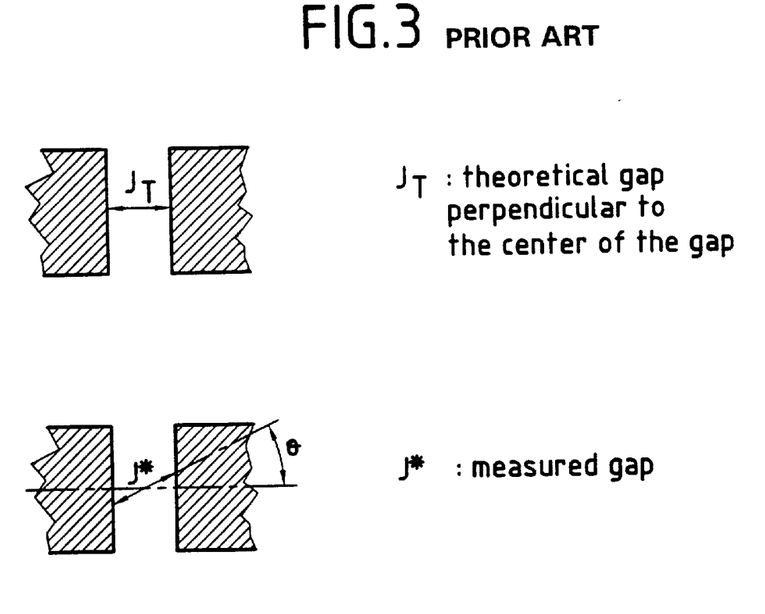
FIG. 3 is a diagram illustrating how the measured value of gap depends on the orientation of the measurement apparatus.

FIG. 3 illustrates the case of a projected brightness line which is not perpendicular to the centre of the gap. In such a case, the measured value, J*, does not represent the true gap which exists between the surfaces 1 and 2. The true value of gap, J, is equal to J*cos θ, where θ represents the rotation of the measurement apparatus with respect to the orientation which would have produced a brightness line perpendicular to the centre of the gap. The same problem arises in relation to mismatch, when the apparatus is rotated in another direction.

The repeatability of the measurements made with the known systems is also influenced by the choice of the reference points and lines between which the spaces are measured, especially when curved (i.e; convexedly-curved) surfaces are being characterised.

Any algorithm used for calculating gap and mismatch must include a definition of the reference points and lines (or planes) between which the spaces will be measured. The quality and the repeatability of the gap and mismatch measurements depends upon a judicious choice of the definitions of those reference points and lines. The definitions must correspond to locations which are stable between different samples of the parts being tested. They must also facilitate the establishment of a geometrical construction which enables a measurement of gap or mismatch to be obtained which corresponds to the physical dimension which is normally understood by this expression.

The importance of this choice of reference points, lines and planes is particularly great given that the current trend in the design of bodywork tends towards shapes which are more and more curved, more closely resembling non-standard surfaces than combinations of planes and cylinders. The definitions of the reference parameters used in the known systems are not well-adapted to the characterisation of parts having this type of shape.

Here, the expression "non-standard surface" means any geometrical surface which cannot be strictly described by an equation.

The U.S. patent U.S. Pat. No. 5,416,590 describes an apparatus for measuring gap and mismatch between two opposing parts, using optical triangulation principles in order to determine the three-dimensional positions of points situated on two brightness lines created by two converging planes of light. Each of the two brightness lines illuminates the interface between the two parts and preferably extends perpendicularly to the centre of the gap (this orientation representing the ideal case). The measurements made by this apparatus are claimed to be reliable even in the case where the apparatus is rotated by 10° with respect to the ideal orientation. The calculations of gap and mismatch include a step of defining reference lines and planes for each of the opposing parts. For each part, these reference parameters are calculated from position data relating to the two brightness lines (more particularly, based on data relating to the portions of the two lines which are located on this part). The gap and mismatch are then calculated by an analyse of the interval or spacing between the reference parameters determined for each part.

Because the light planes used in the system of U.S. Pat. No. 5,416,590 converge, the separation between the two brightness lines depends upon the distance between the measurement apparatus and the surfaces upon which the measurement is being made. This imposes constraints upon the user in terms of the positioning of the apparatus, because he must ensure that the two brightness lines are located within the field of view of the camera and that they are spaced apart by a distance sufficient to enable them to be resolved by the camera. This problem is solved in U.S. Pat. No. 5,416,590 by obliging the user to place the measuring instrument right up against the parts to be measured. However, this solution involves a risk of damaging the parts. Moreover, the user cannot see the precise spot where the measurement will be made, which makes it more difficult to position the apparatus at the correct location.

The fact that the light planes used in the U.S. Pat. No. 5,416,590 system converge means that each of the planes is incident on the parts at an oblique angle, typically 40 to 45°. The images generated by the intersection of the light planes with the parts thus does not correspond to the geometric shape of the parts but to a distorted version thereof caused by perspective.

Further, in the system of U.S. Pat. No. 5,416,590, the image data is binarized before the calculation of the three-dimensional positions of the reference points. This procedure eliminates the possibility of performing a "subpixel" interpolation of the position of the brightness line within the image. This leads to a loss of resolution. In addition, the calculation of gap and mismatch according to this known system involves the modelling of each part by a plane determined using the least squares method. This method does not enable a reliable result (or, even, any result at all) to be obtained in the case of measurements made on parts having curved surfaces.

OBJECTS AND SUMMARY OF THE INVENTION

The present invention seeks to provide an improved method and apparatus for measuring the gap and mismatch between two opposing parts, according to which rotations of the measurement apparatus can be compensated.

The present invention also aims to provide an improved method and apparatus for measuring gap and mismatch between two opposing parts, in which the calculation algorithms are based on definitions of stable and repeatable reference points and lines in order to improve the quality and repeatability of the measured values, notably in the case of measurements made on parts having surfaces the profile of which comprises a portion having a large radius of curvature and, at the end, a portion having a relatively small radius of curvature, such as is the case of crimped (or tacked and fastened) surfaces.

BRIEF SUMMARY OF THE INVENTION

The present invention provides a system for measuring gap and mismatch between the surfaces of two opposing parts, each of the parts having a major surface and an edge, characterised in that:

two parallel planar sheets of light are projected onto the parts in such a way as to create two brightness lines each extending transversely to the edges of the two parts, the image of these two brightness lines is detected by a camera;

the profile of the surfaces in three dimensions is calculated along each brightness line, raw values of gap and mismatch between the surfaces of the two parts are calculated from at least one of these two profiles, and the raw values of gap and/or mismatch are corrected, so as to compensate for possible rotations of the apparatus, by performing a calculation using said raw value, the separation between the two light planes, and the difference between the position of a reference point on one of the two profiles and the position of the corresponding reference point on the other of the profiles.

The use of two parallel projected planes enables, in addition to the determination of the raw values of gap and mismatch, a compensation for possible rotations of the measurement apparatus. Thus, the present invention enables precise measurements of the gap and mismatch between two surfaces to be obtained whilst accepting some uncertainty in the positioning of the measurement instrument; which guarantees good repeatability.

By virtue of the algorithms used in the invention, precise values of gap and mismatch are rapidly evaluated with improved measurement resolution and repeatability compared with the known systems.

In a preferred embodiment of the invention, the calculation of gap and mismatch between two surfaces involves steps of selecting particular reference points and lines on each of the two profiles. By virtue of these definitions of the reference parameters, the gap and mismatch values obtained according to the invention possess a very good repeatability and correspond closely to the theoretical specifications, even in the case of characterising crimped parts.

In a preferred embodiment of the invention, the light source or sources used to produce the light planes are constituted by monochromatic sources, notably laser diodes, and the light detected by the camera is filtered. This enables the elimination of effects due to interference between the light from the brightness lines, which must be detected by the camera, and light coming from other sources present in the surroundings. The latter feature is very advantageous because it enables measurements to be taken while the measurement apparatus is spaced apart from the opposing parts, such that the user can see the precise place where the light planes illuminate these parts.

BRIEF DESCRIPTION OF THE DRAWINGS

Other features and advantages of the present invention will become clear from the following description of preferred embodiments, given by way of example, in connection with the annexed drawings, in which:

FIGS. 7a) to 7c) illustrate the light planes incident on the parts to be characterised when the orientation of the apparatus is rotated with respect to the ideal position: FIG. 7a) illustrating the case of a rotation around the x-axis, FIG. 7b) illustrating the case of rotation around the y-axis and FIG. 7c) illustrating the case of rotation around the z-axis;

DETAILED DESCRIPTION OF THE PREFERRED EMBODIMENTS

Before describing the algorithms and calculations used in the present invention, the construction and arrangement of elements of a system according to a first embodiment of the invention will be briefly described.

Figure 4:
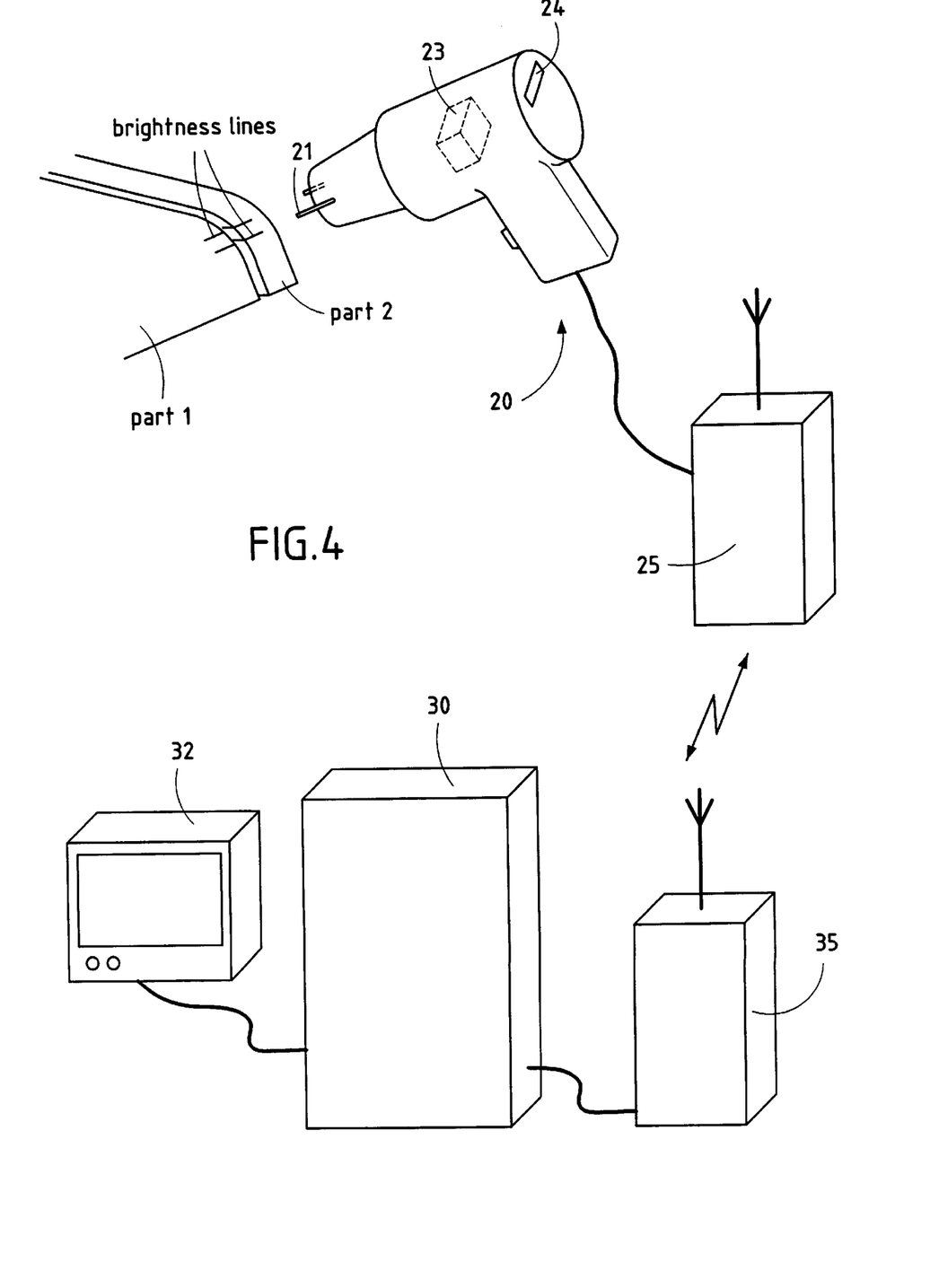
FIG. 4 is a diagram illustrating the main components of a measurement system according to a preferred embodiment of the present invention.

FIG. 4 is a diagram showing the main elements of a system according to a preferred embodiment of the present invention for measuring gap and mismatch. The system consists of an imaging device 20 associated with a data processing and storing unit 30. In the present embodiment, the connection between the imaging device 20 and the data processing unit 30 is established by wireless transmission. Preferably, the data processing unit 30 has several communication channels, for example, five communication channels, in order to be able to receive data coming from five different imaging devices 20.

This wireless method of communication provides the user with greater freedom of movement than the conventional wired connection method. In the context of quality control in the automobile industry, this method makes it simpler to take measurements on a fleet of vehicles. However, the invention can also be put into practice in systems where the imaging device 20 and the data processing unit 30 communicate via a wired connection.

The imaging device 20 takes the form of a measurement gun provided with two rigid rods 21 tipped by soft contact portions. During operation, the operator centres the measurement gun on the centre of the gap to be measured, placing the rods in contact with the surfaces on either side of the gap. This ensures a stable positioning of the device 20 during the data acquisition. Moreover, the space which exists between the measurement gun and the surfaces on which the measurement will be performed enables the user to see precisely the place where the two brightness lines used during the measurement fall. It is thus easy for the user to ensure that the measurement is made at the correct place, which is essential when the measurements are made in the context of quality control on a production line.

The measurement gun can also be provided with a number of markers to simplify alignment of the measurement gun with the interface between the surfaces to be characterised. However, for reasons that will be explained below, orientation errors of the device are compensated by the calculations performed by the processing unit 30.

The imaging device 20 comprises two light sources 22 (shown in FIG. 5) with associated optical elements adapted to produce two planar, substantially parallel, sheets of light emitted from the barrel of the measurement gun. In a preferred embodiment, these light sources are laser diodes. Such laser diodes and plane-generating optics may be readily obtained from sellers of lasers. As an alternative, a single light source can also be used, split into two beams by optical means.

According to the present invention, it is preferred that the light source or sources should be monochromatic (which is the case, for example, when laser diodes are used). This makes it possible to distinguish between light coming from these light sources and light, of different wavelength, coming from other light sources present in the surroundings.

A camera 23 is located in the measurement gun in such a way that the light planes emitted by the laser diodes are in the field of view of the camera. The image sensor of the camera 23 may, for example, be a charge-coupled device (CCD device) comprising pixels arranged in a matrix, or any other means for electronically acquiring images. Preferably, the measurement gun comprises a filter (not shown) arranged so as to filter the light incident on the camera. This filter is centred on the wavelength of the monochromatic light sources used in the measurement gun.

The measurement gun 20 is equipped with a display 24 on which information useful for the operator is displayed, such as the reference number of the current measurement point, the values of gap and mismatch or the differences compared with theoretical values, and the occurrence of measurements outside the permitted tolerances. This display can, for example, be a liquid crystal display (LCD).

The imaging device according to the present embodiment uses components and methods which are already well-known in themselves and which, thus, will not be described in detail here. For example, the calibration of the imaging device 20 so as to determine the distance between each laser source and the camera, and the algebraic definitions of the respective straight lines between each pixel of the CCD camera 23 and the points on each light plane, etc., can equally be performed according to the known methods used in conventional optical triangulation systems.

The measurement schedule can be pre-programmed so as to define the series of measurement points for which data will be acquired, as well as the theoretical values and associated tolerances. In the present embodiment, the imaging device 20 includes at least a trigger for manual operation by the user. It can also include several push-buttons enabling the user to provide a variety of information to the system, such as, the fact that the user is moving on to the next measurement point, that a measurement is going to be repeated, that the operating mode of the apparatus is being changed, etc.

In the present embodiment, the imaging device is connected to a portable transmitter/receiver module 25, for example, carried on the user's belt. The transceiver module 25 communicates, via a bi-directional RS232-type radio link, with a transceiver module 35 connected to the data processing unit. This link enables the remote management of the display 24 and of adjustments of the camera 23 and laser diodes 22 of the imaging device 20. The video data is transmitted, by a supplementary wireless link, from the transceiver module 25 to the data processing unit 30.

The data processing unit is preferably a PC-type microcomputer provided with the combination of a digitizing and image-processing card and a computer program enabling the measurement schedules to be programmed, and the control and measurement data to be archived in a format readable by any text editor. Preferably, the data processing unit is connected to a display unit 32. During measurement, the obtained values are displayed both on the screen of the display unit and on the display 24 of the imaging device 20. The initial steps of the image data processing, in order to generate a 3-dimensional profile for each of the brightness lines, make use of methods which are already known from conventional optical triangulation systems. The processing of the profile data according to the present invention is described in greater detail below.

The fact that the determination of the reference points of the geometrical constructions are not based on the two-dimensional exploitation of the images but are based on a three-dimensional profile calculated by optical triangulation permits to obtain a very high precision of the calculations of gap and mismatch. In fact, the bi-dimensional processing of images of projection of light planes induces uncertainties on the positions of reference points which are linked to the variations of the scale factor (image size on object size). This mode of determination of reference points requires at least to ensure a constant spacing of the measurement instrument with respect to the surfaces to be characterised, which is not always feasible in practice due to the morphology of the parts.

The precision of the apparatus which is the subject matter of the present invention is optimised since it is independent from the position of the measurement gun with respect to the measured sample as far as the distance and the angular position are concerned inasmuch as the sample remains within the volume of optical work of the gun.

Various modifications of the system according to this embodiment can be envisaged without departing from the present invention. For example, the imaging device employed to generate the image data representing the interface between the opposing parts can use an extra camera so as to obtain access to points which are not visible to the first camera.

The steps of the calculation according to the present invention of gap and mismatch between opposed crimped parts will now be described. Parts having this shape are often used in the automobile or aeronautical industries.

The algorithms of the present invention comprise two main stages: a calculation of raw values of gap and mismatch, and a correction calculation for compensating these values for possible rotations of the measurement apparatus with respect to the ideal orientation. To aid understanding by the reader, the correction calculation will be described first of all, assuming the existence of raw values of gap and mismatch. Then there will be an explanation of how the initial values of gap and mismatch are evaluated according to the preferred embodiment of the invention.

Figure 5:
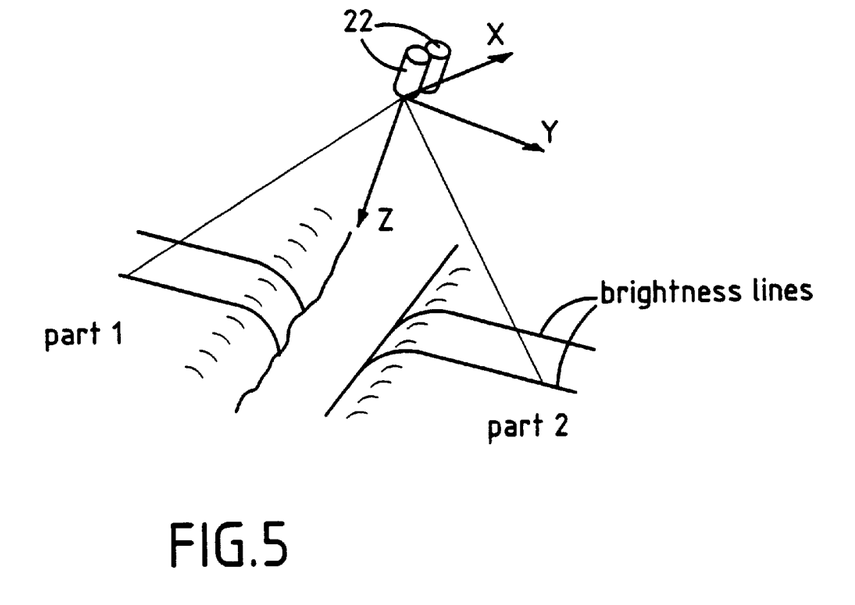
FIG. 5 illustrates the frame of reference of the device.

FIG. 5 illustrates the frame of reference relative to the optical detector of the system, according to the presently preferred embodiment of the invention. The origin is the centre of projection of one of the two laser light sources, the x-axis is perpendicular to the light plane, the y-axis is perpendicular to the axis of the laser light source and is contained in the first laser light plane, and the z-axis is coaxial with the axis of the laser light source, orientated in the direction of projection of the light.

Figure 6A:
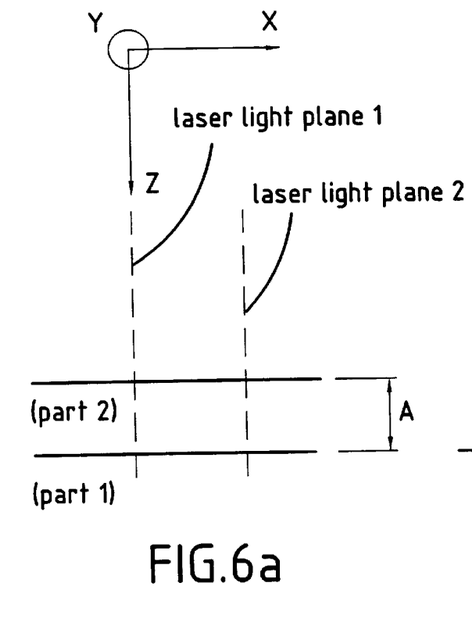
FIGS. 6a) to 6c) illustrate the light planes incident on the parts to be characterised, according to the ideal positioning of the measurement apparatus, FIG. 6a) showing a view in the direction of the y-axis, FIG. 6b) showing a view in the direction of the x-axis and FIG. 6c) showing a view in the direction of the z-axis.
Figure 6B:
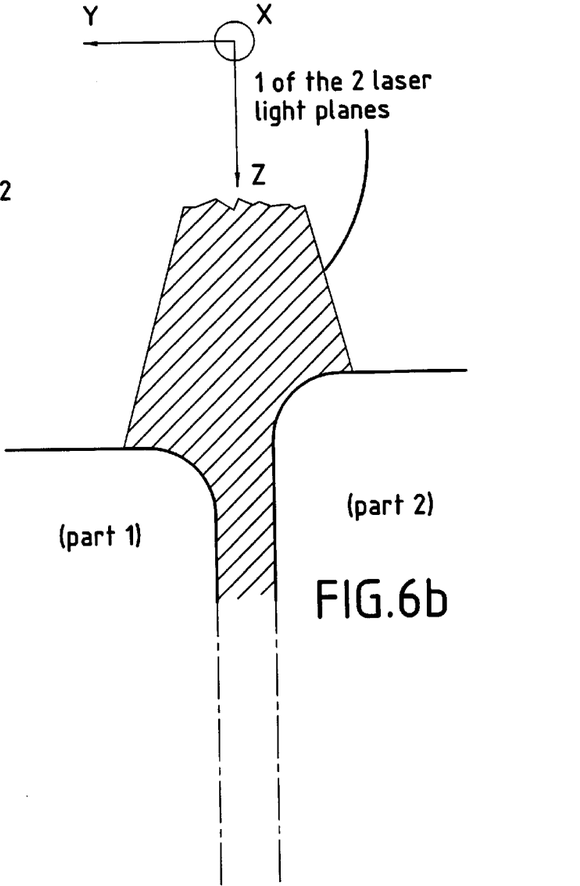
Figure 6C:
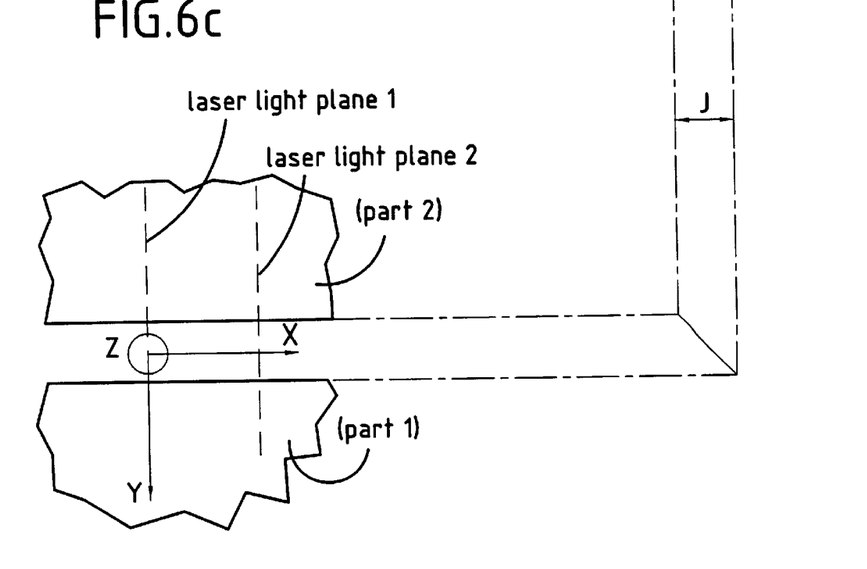

FIGS. 6a) to 6c) illustrate the light planes incident on the interface between the two parts 1,2 to be characterized, when the measurement apparatus is in the ideal orientation. FIG. 6a) shows a view in the x–z plane. FIG. 6b) shows a view in the y–z plane. FIG. 6c) shows a view in the x–y plane. For a better understanding of the dimensions being measured, these diagrams (as well as those of FIG. 7) show parts whose profiles include rectilinear portions.

Figure 7A:
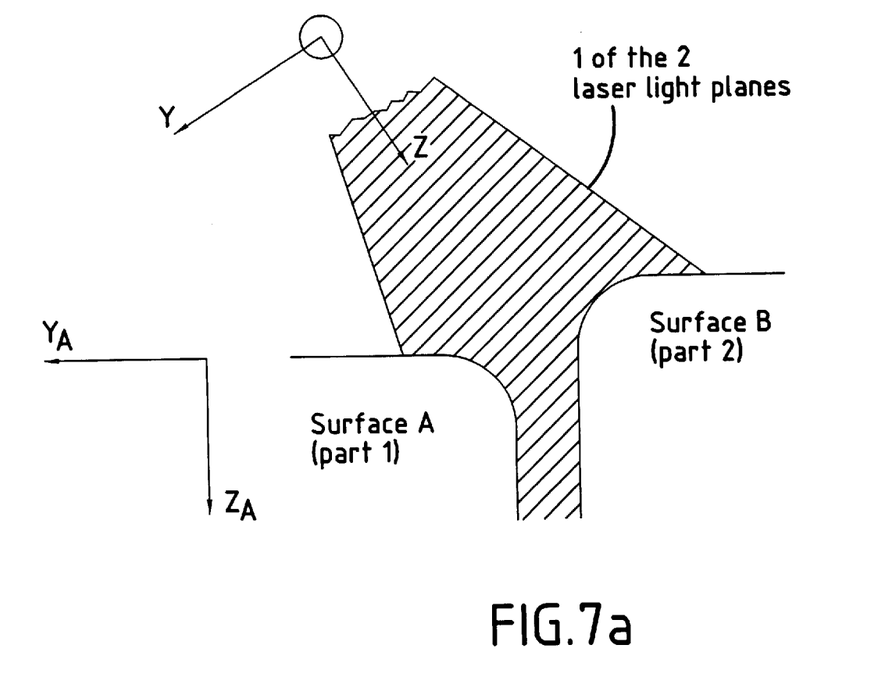
Figure 7B:
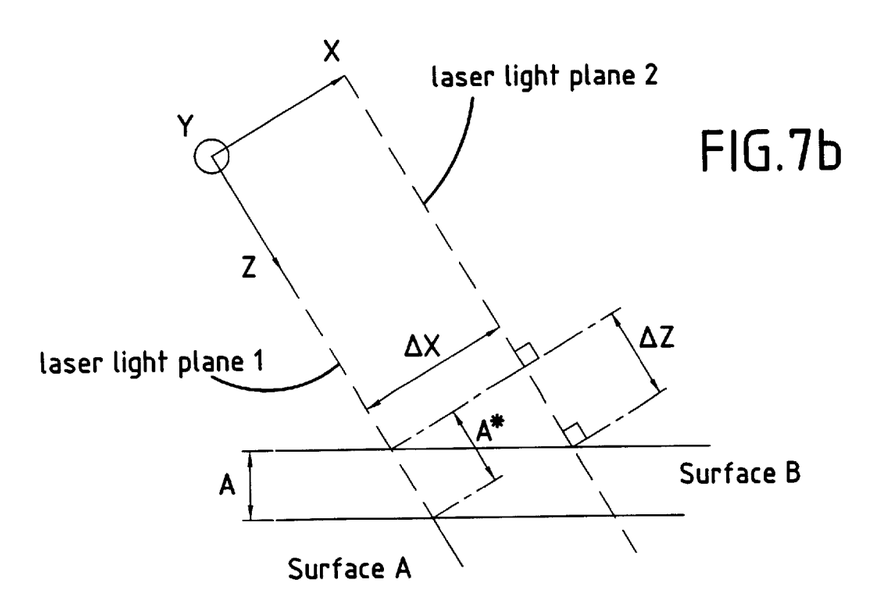
Figure 7C:
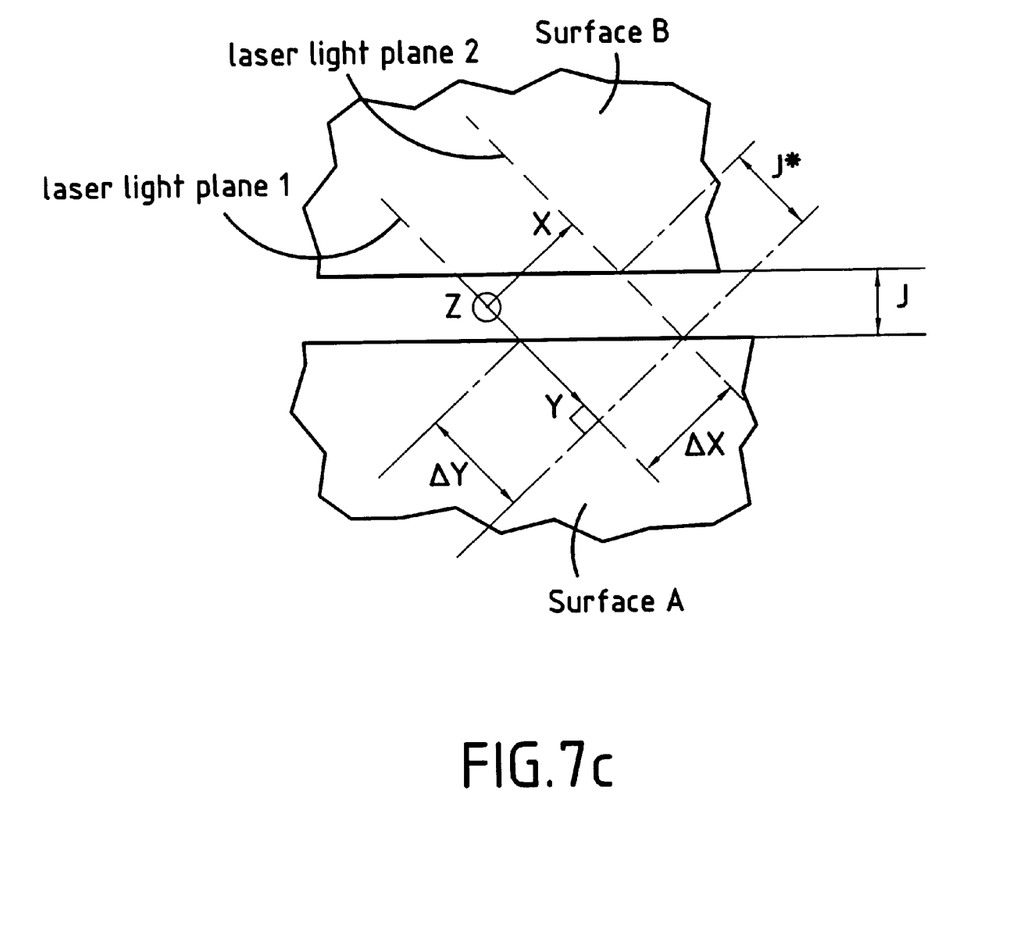

FIGS. 7a), 7b) and 7c) illustrate the light planes incident on the interface between the two parts 1,2 in the case of a rotation of the measurement apparatus with respect to the ideal position, around the x, y and z axes, respectively.

In the case where the measurement apparatus is rotated around the x-axis, there is no effect on the evaluated values of gap and mismatch to the extent that these measurements are calculated from image points generated by a single one of the projected light planes (that is, the calculations of gap and mismatch use points which are all located in a common plane parallel to the y–z plane).

In the case where the measurement apparatus is rotated around the y-axis or z-axis, the values of gap and mismatch, respectively, are altered. According to the present invention, this problem can be solved by performing a correction of the values of gap and mismatch which are initially calculated. In order to be able to perform each of these corrections, a reference point is designated on one of the parts to be characterized, the co-ordinates of this reference point are determined on each of the half-profiles corresponding, respectively, to the image of this part in the two brightness lines, and the apparent difference in position of this reference point is used to perform the correction.

In the case where the measurement apparatus is rotated around the y-axis, the measured gap does not change. However, the apparent mismatch no longer corresponds to the true mismatch. According to the present invention, this problem can be solved by performing a correcting of the initial calculated value of mismatch, according to the following equation:

$$A = A^* \sqrt{\Delta x^2 / (\Delta x^2 + \Delta z^2)}$$

where A represents the corrected value of mismatch, A* represents the initial value of mismatch, $\Delta x$ represents the calibrated separation between the light planes and $\Delta z$ represents the difference in position, in the direction of projection (z), of the reference points of the two half-profiles.

In the case where the measurement apparatus is rotated around the z-axis, the mismatch is not affected. However, the apparent gap no longer corresponds to the true gap. According to the present invention, this problem can be solved by performing a correction of the initial calculated gap value, according to the following equation:

$$J = J^* \sqrt{\Delta y^2 / (\Delta x^2 + \Delta y^2)}$$

where J represents the corrected gap value, J* represents the initial gap value, $\Delta x$ represents the calibrated separation between the light planes and $\Delta y$ represents the difference in position of the corresponding reference points of the two half-profiles, in the direction (y) orthogonal both to the direction of projection (z) and to the direction (x) perpendicular to the illumination plane.

Figure 9:
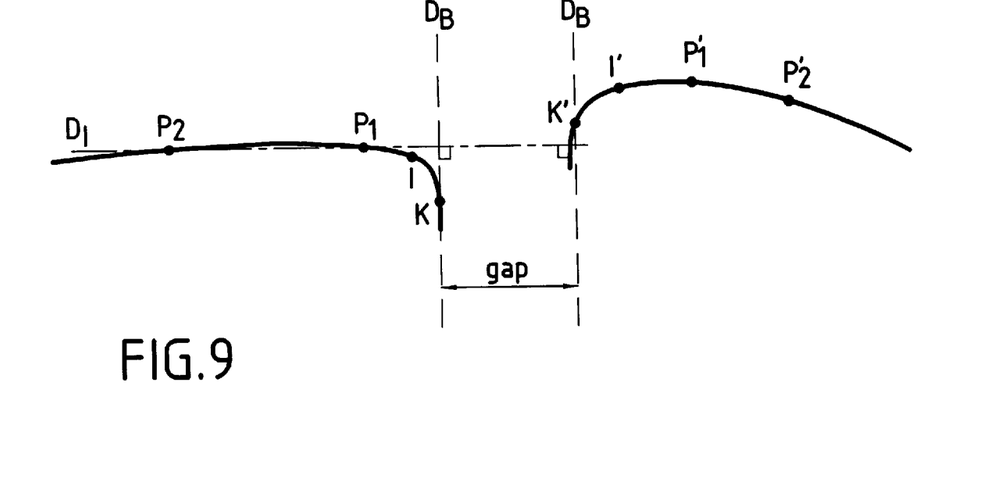
FIG. 9 is a diagram showing how a value of gap is calculated according to the preferred embodiment of the present invention.
Figure 10:
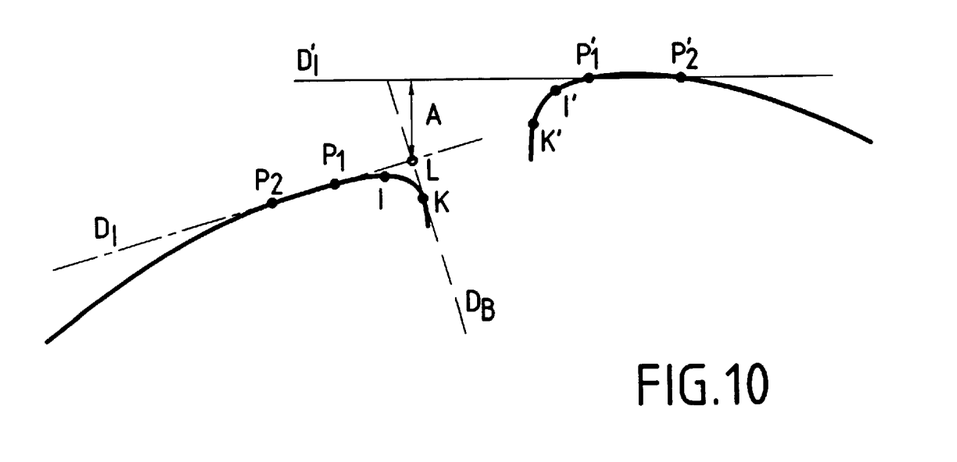
FIG. 10 is a diagram illustrating how a value of mismatch is calculated according to the preferred embodiment of the present invention.

The preferred method for calculating the initial values of gap and mismatch according to the present invention will now be explained with reference to FIGS. 8 to 10.

First the data generated from one of the brightness lines is processed so as to determine reference points and lines for each of the two parts, respectively. Next, the spacings between these reference points and lines are evaluated so as to produce the initial values of gap and mismatch. For the reasons explained below, preferably the data generated from the other of the brightness lines is then processed in the same way so as to produce a second pair of values of gap and mismatch.

The designation of the reference points and line son the profile of one of the opposing parts will now be described with reference to FIG. 8. The same method is used so as to designate the corresponding reference points and lines on the profile of the other of the parts.

Figure 8A:
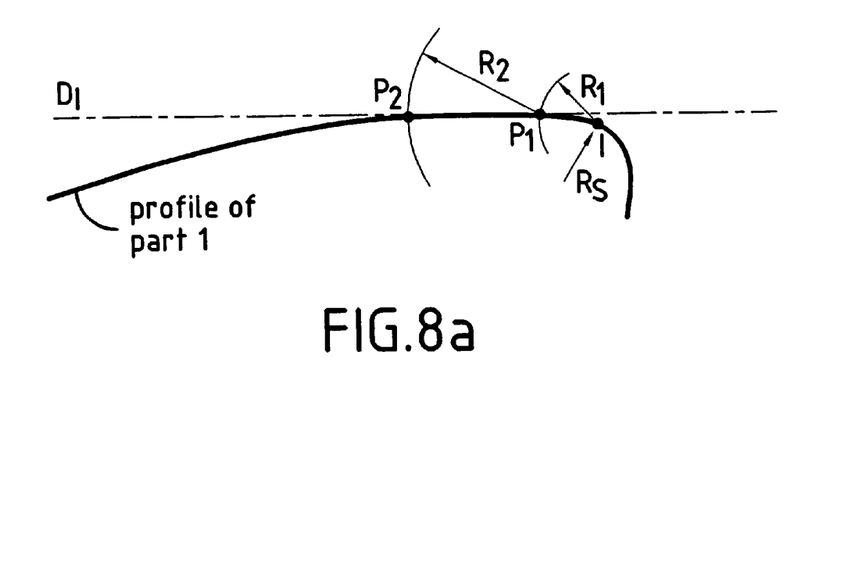
FIGS. 8a) and 8b) show the reference points and lines defined according to the preferred embodiment of the present invention.
Figure 8B:
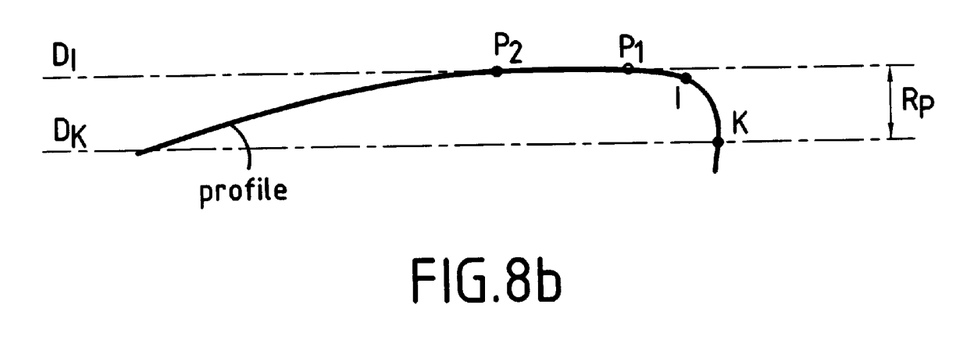

The example of FIG. 8 relates to opposing parts which both have crimped surfaces. Contrary to the simple theory which considers that, for such parts, the radius of curvature is constant at the crimped edge portion, the present inventors realized that the radius of curvature changes at that location as if the curve in question were somewhat flattened. The following method for designating the reference points and lines is optimized for crimped parts.

First of all, a first, fixed reference point, I, is designated making use of a characteristic peculiar to the non-standard curves typical of crimped metal sheets which is that they always have a region where there is a rapid variation of the radius of curvature (see FIG. 8a)). Starting from the end of the curve (having the lowest curvature) and analysing the value of the radius of curvature point-by-point, the position on the curve where the value of this radius of curvature becomes less than a threshold value $R_S$ is determined. This latter position identifies the point I.

The choice of the threshold value $R_S$ is made following a statistical analysis of the shape of samples of the parts upon which the measurement will be performed. If the value thereof is too great then the measurement noise will lead to poor repeatability of the position of point I. If the value thereof is too low then it is possible that this change of the curvature will be undetectable. In practice, it has been found that in the case of crimped metal sheets, the appropriate threshold value $R_S$ is often related to the thickness of the sheets. For example, a threshold value of 3 mm is appropriate in the case of crimped metal sheets 0.7 mm thick (more generally, this value is suitable in the case of any crimped metal sheet of normal thickness, that is, whose thickness is in the range 0.67 to 0.8 mm).

Once this reference point I has been found, a first point of geometrical construction $P_1$ is obtained, at a distance $R_1$ from I, and then a second geometrical construction point $P_2$ is obtained, at a distance $R_2$ from $P_1$. A straight line $D_I$ is then designated passing through the points $P_1$ and $P_2$. When the surfaces are slightly curved, a first line of reference $D_1$ may also be defined by the best fit line that is the best approximation to all the points between the two points of geometrical construction $P_1$, $P_2$.

The distances $R_1$ and $R_2$ are chosen dependent upon the parameters of the optical system as well as the desired measurement range, while optimizing the stability of the chosen reference points and lines.

In order to find a reference line representative of the major surface of the part in question, it is necessary that the point of geometrical construction $P_1$ should be located on the flatter portion of the surface. In order for the reference line $D_I$ to be stable and repeatable, it is necessary that image data should have been detected for point $P_2$. Thus, this point $P_2$ should not be outside of the field of view of the camera.

It will be understood that the imaging device has a certain field of view and that, if the range of gap values that it is desired to measure occupies up to a half, two-thirds, etc. of the extent of the field of view then, in the case of the maximum gap, there will only remain half, a third, etc. of the extent of the field of view for accommodating the portions of the two parts capable of being seen by the camera. For example, in the case where the field of view of the apparatus is limited to 25 mm, and the maximum gap measurable by the system is 12 mm, the detected images of the opposing parts only concern 13 mm of the surfaces thereof (6.5 mm on either side of the space between the parts). It follows that the sum of the distances $R_1$ and $R_2$ must be such that the point of geometrical construction $P_2$ corresponds to a point which is located on that portion of the part in question which has been seen by the camera.

It has also been discovered that the distance between the points of geometrical construction $P_1$ and $P_2$ must be sufficiently long to ensure stability of the reference line. In practice, the value $R_1$ is selected so that the point $P_1$ corresponds to a point located on the major surface of the part but as close as possible to the more curved portion at the edge of the part, and the value $R_2$ is selected so as to maximize the distance between the points $P_1$ and $P_2$. According to the example considered above, where a portion 6.5 mm long of each part is visible, $R_1$ could be chosen=1 mm and $R_2$=5.5 mm. However, such a choice of values would require a very great precision in the positioning of the apparatus with respect to the centre of the gap. It is, thus, preferable according to this example to choose $R_2$=4 mm.

After the determination of the reference line $D_I$, another fixed reference point K is next determined (see FIG. 8b)). The position of a straight line of construction $D_K$ is found by lowering a line parallel to the reference line $D_I$ towards the interior of the part by a distance $R_P$. The intersection between this line $D_K$ and the profile of the part constitutes the point K.

The gap will be calculated by determining the spacing between the points K of the two opposing parts. It is, thus, preferable that this point K should correspond to a point close to the maximum curvature in the case of parts folded at 90° or more. In essence, it is sought to find a point which corresponds to that which would be contacted by the arms of a set of callipers in a measurement system using physical contact. In this way, the gap measurement made by the apparatus according to the invention corresponds closely to the physical quantity which coach-makers (workers dealing with bodywork) understand by that term.

In the case of crimped metal sheets, for which one metal sheet is bent around the edge of another sheet of the same thickness, this point K corresponds roughly to a position corresponding to half of three thicknesses of the metal sheets in question. The thickness of the metal sheets used generally is between 0.67 and 0.8 mm, and a maximum of 1 mm, so that they can be pressed or soldered by conventional machines without specific stresses, and manufacturing costs can be reduced. Thus, in the case of metal sheets 0.7 mm thick, the theoretical distance $R_P$ is 1.0 mm. However, it is advantageous that this point K should correspond to a point for which image data has been detected by the camera. It is thus preferable that the distance $R_P$ should be 0.8 mm in the example in question.

If the intersection of the line $D_K$ and the curve is located on a portion of the profile where the sample points are insufficient, the extrapolation of the curve, in the y direction, is calculated by modelling thereon a selected polynomial of order n, for example a third order polynomial. In the case where this extrapolation produces an intersection which is too far away from the nearest of the sample points, an error condition is signalled.

The calculation of the raw value of gap will now be described with reference to FIG. 9. The reference line $D_I$ of one of the parts is taken as a position reference. then the distance is evaluated between two straight lines $D_B$, $D_B'$, passing respectively through the points K, K' and both perpendicular to the line $D_I$.

In some cases, the obtained raw value for gap depends upon which of the lines $D_I$ or $D_I'$ has been used as the position reference for the calculation. It is, thus, preferable to adopt a constant practice such as, for example, always using as the position reference the line $D_I$ designated for the left-hand part. It suffices if the convention adopted is constant as far as a given measurement point in the measurement schedule is concerned, different conventions can be adopted for different measurement points. So as to eliminate any ambiguity, the correct orientation of the imaging device can be ensured by providing the latter with a visual marker. In a variant, the correct orientation of the imaging device can be ensured by displaying on the display 24 an instruction to the user indicating which orientation of the device is required for the measurement point in question.

The calculation of mismatch will now be described with reference to FIG. 10. Another reference point L is designated corresponding to the intersection of the line $D_B$ and the line $D_I$ of one of the parts. The line $D_I'$ of the other of the parts is taken as the position reference. The minimum distance (in the direction perpendicular to the line $D_I'$) between the point L and the line $D_I'$ is then evaluated as the mismatch.

In the preferred embodiment of the present invention, two pairs of raw values of gap and mismatch are calculated by processing the data from each of the two brightness lines, respectively. The two raw values of gap are compared so as to determine whether the different between then exceeds a threshold level. In the case where the difference between the two raw gap values is great, this can arise because the size of the gap existing between the two parts is not constant but increases or decreases along the length thereof. In the same way, the two raw values of mismatch are compared so as to evaluate whether the difference between them exceeds a threshold level. In the case where the difference between the two raw values of mismatch is great, this can correspond to the case where the mismatch is not constant but is changing. It is preferable not to acquire a value of gap or mismatch for a measurement point where the parameter concerned is changing.

In the preferred embodiment of the invention, the data processing unit 30 is adapted to discriminate the existence of a changing value of gap (or mismatch) and to send a message to the imaging device 20 indicating that no value of gap (or mismatch) should be retained for the measurement point concerned.

After having calculated the raw values of gap and mismatch these are corrected, according to the method described above, so as to compensate for possible rotations of the imaging device with respect to the ideal orientation. In the preferred embodiment of the invention, this compensation calculation uses, as the reference point whose position change is evaluated, the reference point I defined above.

Using a measurement system according to the preferred embodiment of the invention, gaps and mismatches can be measured with an overall uncertainty in the measurement of 0.1 mm (at three σ, where σ is the standard deviation), over a measurement range from 0 to 10 mm for gap and 0 to 8 mm for mismatch.

The above-described algorithm enables very good results to be obtained when the measurements are made on opposing crimped surfaces. This represents about 80% of the cases encountered in the automobile industry. However, other cases exist for which variations of the above-described method will be better adapted.

In the case where one of the opposing surfaces is a non-standard surface other than a crimped surface, the statistical analysis needed to establish the threshold value $R_S$ to be used in the determination of the first reference point I is lengthy and it is not necessarily worthwhile to perform it. Another method according to the present invention, enabling gap and mismatch values to be determined in the case of a non-standard surface opposing a curved surface (in this example, a crimped surface) will now be described with reference to FIG. 11.

Figure 11:
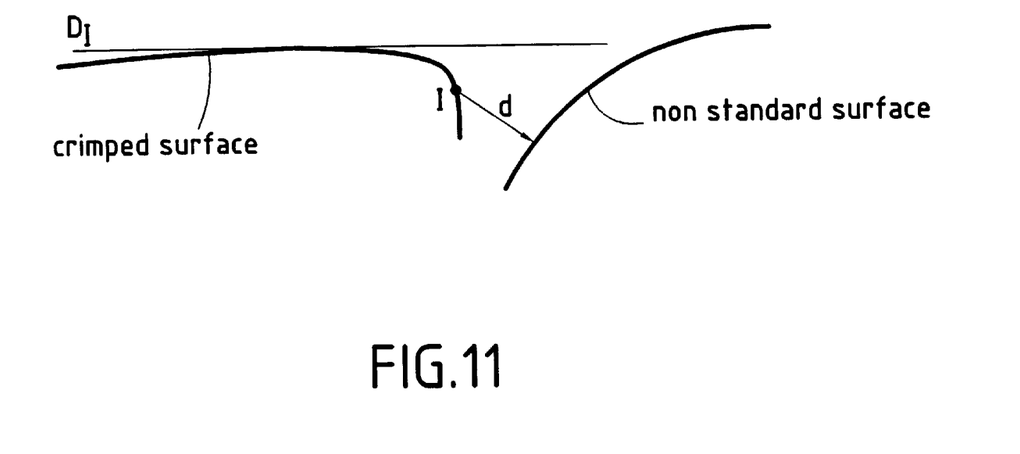
FIG. 11 is a diagram illustrating another method according to the invention which enables values of gap and mismatch to be determined.

According to this alternative method, the first reference point I and the reference line $D_I$ are determined for the crimped surface according to same procedure as in the previously-described method. Next, a calculation is performed to determine the shortest vector d between the point I of the crimped surface and the opposing non-standard surface. The values of the components of this vector d which are, respectively, parallel and perpendicular to the reference line $D_I$ of the crimped surface will constitute the raw values of gap and mismatch.

In the case of parts having a substantially planar principal surface connected to a curved edge, it is preferable to determine the location of the first reference point I by departing from the method described above with reference to FIG. 8. This other variation of the basic method will be described with reference to FIG. 12.

Figure 12:
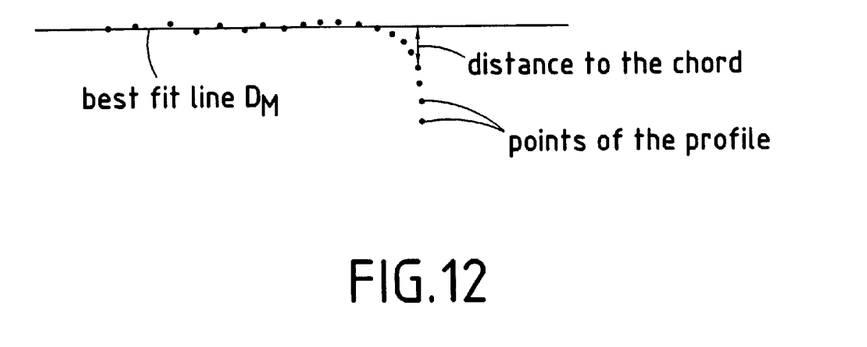
FIG. 12 is a diagram illustrating another method according to the invention enabling the location of the first reference point I to be determined.

According to the variation illustrated in FIG. 12, the principal surface of the part is modelled by a straight line $D_M$, notably the line which passes through a maximum number of points on the profile. The distance to the chord, that is, the distance between each point and the line $D_M$ is next evaluated, extrapolating this line $D_M$ towards the space between the opposing parts. The first point for which the distance to the chord is equal to or greater than a threshold value $R_C$ is designated as the first reference point I.

The threshold value $R_C$ is chosen sufficiently large such that the roughness of the surface will not distort the calculation but sufficiently small that it will represent the interface point between flat and curved portions of the surface. In the case of the metal sheets habitually used in the automobile industry, this value $R_C$=0.1 mm.

Once this first reference point I has been designated, the method for determining the reference lines and points can follow the same steps as the method previously described with reference to FIGS. 8 to 10.

In the preferred embodiments of the present invention, values of gap and mismatch are determined using the reference points and lines mentioned above and then the obtained values are corrected so as to compensate for possible rotations of the measurement apparatus, this correction being possible by virtue of the projection of two parallel light planes onto the parts to be characterized. This combination of measures enables a noticeably improved performance to be obtained, in terms of resolution and repeatability, compared with the systems of the prior art. However, even if the initial values of gap and mismatch are determined from the image of one brightness line using another choice of reference points and lines (and/or planes), the use of two parallel light planes in order to create a second brightness line enables a correction of these values to be performed so as to free the user from the need to position the measurement apparatus in a precise orientation.

Furthermore, the reference lines and points used in the calculation of the raw gap and mismatch values according to the preferred embodiment of the invention are optimized such that the use thereof, even in a system using a single light plane and, thus, lacking a compensation for possible rotations of the imaging device, leads to an improved repeatability of measurement.

Various changes and modifications of the preferred embodiments described above will readily occur to the skilled person. The described embodiments are to be considered in all respects only as illustrative and in no way as being restrictive, and the scope of the invention is, therefore, indicated in the appended claims. It is to be understood that all changes which come within the meaning and range of equivalency of the present claims fall within the spirit and scope of the present invention.

What is claimed is:

1. System for measuring gap and mismatch between two opposing parts, said opposing parts having respective surfaces, each said surface having a respective profile, and said surfaces having opposing edges, wherein two parallel planar sheets of light are projected onto the parts so as to create two brightness lines each extending transversely to the edges of the two parts, said two parallel planar sheets of light being spaced from one another by a known separation ($\Delta x$), said two brightness lines are imaged by a camera, the profile of the surfaces in 3 dimensions is calculated along each brightness line, raw values of gap ($J^*$) and mismatch ($A^*$) between the surfaces of the two parts are calculated from at least one of these two profiles, a reference point is defined on one of the two profiles at a first position thereon and a corresponding reference point is defined on the other of the profiles at a second position thereon, a difference existing between said positions of said reference points, and the raw values of gap and/or mismatch are corrected, so as to compensate possible rotations of the apparatus, by performing a calculation using said raw value, the separation ($\Delta x$) between the two light planes, and the difference between the position of the corresponding reference point on the other of the profiles.

2. System according to claim 1, for measuring gap and mismatch between two opposing parts, wherein the raw value of mismatch $A^*$ is corrected according to the following equation:

$$A = A^* \sqrt{\Delta x^2 / (\Delta x^2 + \Delta z^2)}$$

where A represents the corrected value of mismatch, $\Delta x$ represents the separation between the light planes, and $\Delta z$ represents the position difference of the corresponding reference points of the two profiles in the direction of projection (z).

3. System according to claim 1, for measuring gap and mismatch between two opposing parts, wherein the raw value for gap $J^*$ is corrected according to the following equation:

$$J = J^* \sqrt{\Delta x^2 / (\Delta x^2 + \Delta y^2)}$$

where J represents the corrected value of gap, $\Delta x$ represents the separation between the light planes, and $\Delta y$ represents the position difference of the corresponding reference points of the two profiles in the direction (y) orthogonal both to the direction of projection (z) and to the direction (x) perpendicular to the light plane.

4. System according to claim 1, for measuring gap and mismatch between two opposing parts, and comprising the step of determining, for at least one of the profiles, on the portion thereof representing one of the two opposing parts, a first reference point (I) where the radius of curvature of the profile takes a predetermined threshold value ($R_S$).

5. System according to claim 4, for measuring gap and mismatch between two opposing parts, wherein the predetermined threshold value ($R_S$) is chosen, dependent upon the results of a statistical analysis of the parts upon which the measurement will be performed, so as to have a value sufficiently great that this change in curvature can be detected but sufficiently low that the measurement noise is restricted to a level which does not harm the repeatability of the measurement.

6. System according to claim 4, for measuring gap and mismatch between two opposing parts, and comprising the step of determining from said profile, a first reference line ($D_I$, $D_I'$) for each of the opposing parts according to the following method:

a) determining, on that portion of the profile representing said part, the first reference point (I);

b) determining a first point of geometrical construction ($P_1$) representing the point of intersection of said portion of the profile with the circumference of a circle of radius $R_1$ centred on the first reference point (I);

c) determining a second point of geometrical construction ($P_2$) representing the point of intersection of said portion of the profile with the circumference of a circle of radius $R_2$ centred on the first point of geometrical construction ($P_1$); and d) designating as the first reference line ($D_I$) the straight line passing through the two points of geometrical construction ($P_1,P_2$).

7. System according to claim 6, for measuring gap and mismatch between two opposing parts, wherein the raw value of mismatch ($A^*$) is evaluated from said profile by calculating the spacing between the two first reference lines ($D_I,D_I'$) designated for the two opposing parts, respectively.

8. System according to claim 6, for measuring gap and mismatch between two opposing parts, wherein the raw value of gap ($J^*$) is evaluated from one of said profiles by calculating the spacing between two second reference points (K) each designated for a respective one of the opposing parts, for each of the parts the second reference point (K) being determined according to the following method:

a) determining on the portion of the profile representing said part an offset reference line ($D_K$), which is substantially parallel to the first reference line ($D_I$) designated for this part, and which is spaced from said first reference line towards the interior of the part by a distance ($R_P$), and b) designating, as the second reference point (K), the point of intersection of the profile with said offset reference line ($D_K$).

9. System according to claim 8, for measuring gap and mismatch between two opposing parts, wherein the distance $R_P$ is chosen such that the second reference point (K) corresponds to the greatest radius of curvature of the surface in question.

10. System according to claim 8, for measuring gap and mismatch between two opposing parts, wherein, in the case where the second reference point (K) established on the basis of said method corresponds to a portion of the profile for which image data is not available, the position of the second reference point (K) is calculated, by performing modelling using a selected $n^{th}$ order polynomial, based on image data which is available.

11. System according to claim 8, for measuring gap and mismatch between two opposing parts, wherein the raw value of gap (J*) is evaluated from one of the profiles according to the following method:

a) designating, as a second reference line for a first one of the parts, a straight line ($D_B$) passing through the second reference point (K) designated for this first part, and perpendicular to the first reference line ($D_I$) of said first part;

b) designating, as a third reference line, for the other of the parts, a straight line ($D_B'$) passing through the second reference point (K) designated for this other part, and perpendicular to the first reference line ($D_I$) designated for said first part; and c) calculating as the raw value of gap (J*), the distance between these second and third reference lines ($D_B$, $D_B'$).

12. System according to claim 10, for measuring gap and mismatch between two opposing parts, wherein the raw value of mismatch is evaluated from one of the profiles according to the following method:

a) designating, as a second reference line for a first one of the parts, a straight line ($D_B$) passing through the second reference point (K) designated for this first part, and perpendicular to the first reference line ($D_I$) of said first part;

b) determining the point of intersection (L) of this second reference line ($D_B$) designated for the first part with the first reference line ($D_I$) designated for this first part; and c) calculating, as the raw value of mismatch (A*), the minimum distance between said point of intersection (L) and the first reference line ($D_I'$) designated for the other of the opposing parts.

13. System according to claim 4, for measuring gap and mismatch between two opposing parts, wherein the calculation correcting the raw values of gap and mismatch uses, as the reference point whose change of position is evaluated, the first reference point (I) designated for one of the opposing parts.

14. System according to claim 1, for measuring gap and mismatch between two opposing parts, wherein the two light planes are produced from a monochromatic light source, or sources, possessing a wavelength λ and the light received by the camera is filtered so as to eliminate the wavelengths distant from the wavelength λ.

* * * * *